(12) United States Patent
Fuentes et al.

(10) Patent No.: US 12,144,341 B2
(45) Date of Patent: Nov. 19, 2024

(54) RODENTICIDE BAIT COMPOSITION

(71) Applicant: Reckitt Benckiser LLC, Parsippany, NJ (US)

(72) Inventors: Heidi Fuentes, Montvale, NJ (US); Bikramjit Singh, Montvale, NJ (US)

(73) Assignee: Reckitt Benckiser LLC, Parsippany, NJ (US)

( * ) Notice: Subject to any disclaimer, the term of this patent is extended or adjusted under 35 U.S.C. 154(b) by 332 days.

(21) Appl. No.: 17/277,813

(22) PCT Filed: Sep. 26, 2019

(86) PCT No.: PCT/GB2019/052709
§ 371 (c)(1),
(2) Date: Mar. 19, 2021

(87) PCT Pub. No.: WO2020/065314
PCT Pub. Date: Apr. 2, 2020

(65) Prior Publication Data
US 2023/0062709 A1    Mar. 2, 2023

(30) Foreign Application Priority Data

Sep. 26, 2018  (GB) ...................... 1815704

(51) Int. Cl.
| | | |
|---|---|---|
| *A01N 25/00* | (2006.01) | |
| *A01N 25/32* | (2006.01) | |
| *A01N 43/16* | (2006.01) | |
| *A01N 43/90* | (2006.01) | |
| *A01N 57/02* | (2006.01) | |
| *A01N 59/06* | (2006.01) | |
| *A01P 11/00* | (2006.01) | |

(52) U.S. Cl.
CPC ........... *A01N 25/004* (2013.01); *A01N 25/32* (2013.01); *A01N 43/16* (2013.01); *A01N 43/90* (2013.01); *A01N 57/02* (2013.01); *A01N 59/06* (2013.01); *A01P 11/00* (2021.08); *A01N 2300/00* (2013.01)

(58) Field of Classification Search
CPC ...... A01N 59/06; A01N 2300/00; A01P 11/00
See application file for complete search history.

(56) References Cited

U.S. PATENT DOCUMENTS

| | | | |
|---|---|---|---|
| 4,581,378 A | 4/1986 | Lazar et al. | |
| 5,151,416 A | 9/1992 | DeLuca et al. | |
| 8,574,638 B1 * | 11/2013 | Perry | A01N 25/004 424/725 |
| 2014/0271932 A1 * | 9/2014 | Rubel | A01N 25/004 424/717 |

FOREIGN PATENT DOCUMENTS

| | | |
|---|---|---|
| CN | 103583567 A | 2/2014 |
| CN | 105994315 A | 10/2016 |
| EP | 2742801 A2 | 6/2014 |
| EP | 3295793 A1 | 3/2018 |
| EP | 3384769 A1 | 10/2018 |
| WO | 2013/093543 A1 | 6/2013 |
| WO | 2014186885 A1 | 11/2014 |
| WO | WO-2018187199 A1 * | 10/2018 ........... A01N 25/004 |

OTHER PUBLICATIONS

S.H. Goh et al., "Phospholipids of palm oil (*Elaeis guineensis*)", Journal of the American Oil Chemists' Society (JAOCS), vol. 59, No. 7, Jul. 1, 1982, pp. 296-299.

International Search Report and Written Opinion dated Feb. 10, 2016, issued in connection with international Application No. PCT/US15/064,882.

Examination Report No. 1 dated Jul. 11, 2024 in Australian Application No. 2019349861, filed Apr. 1, 2021.

* cited by examiner

*Primary Examiner* — Snigdha Maewall
(74) *Attorney, Agent, or Firm* — Dunlap Codding, P.C.

(57) ABSTRACT

The present invention relates to a rodenticide bait composition comprising a calcium salt and a dehydrant; wherein the calcium salt is selected from the group consisting of calcium carbonate, calcium citrate, calcium acetate, calcium benzoate, calcium octanoate, calcium stearate, calcium silicate, calcium oxide silicate, calcium sulfate, calcium chloride, calcium bromide, calcium iodide, calcium lactate, calcium gluconate, calcium oxalate, calcium phosphate and combinations of two or more thereof; wherein the calcium salt is present in an amount of less than 20 wt. % based on the total weight of the composition; wherein the dehydrant comprises one or more sources of cellulose and one or more sources of phospholipids.

18 Claims, No Drawings

RODENTICIDE BAIT COMPOSITION

CROSS-REFERENCE TO RELATED APPLICATIONS

This application is a U.S. National Phase of International Patent Application No. PCT/GB2019/052709, filed on 26 Sep. 2019, which claims priority to United Kingdom Application Serial No. 1815704.0 filed 26 Sep. 2018. The entire contents of these applications are incorporated herein by reference in their entirety.

TECHNICAL FIELD

The present disclosure relates to a rodenticide bait composition. In particular, the present disclosure relates to a rodenticide bait composition that is effective against rodents, without being toxic to humans or other non-target mammals.

The present disclosure further relates to a packaging comprising said rodenticide bait composition, to a method for preparing a rodenticide bait composition, to a method for exterminating a rodent and to the use of a mixture in a rodenticide bait composition.

BACKGROUND

Rodenticide bait compositions are well-known and widely used against rats, mice and other rodents. Such compositions generally contain a substance that is toxic to the target rodents together with a substance that the rodents are fond of eating. While a number of effective rodenticides are known, many present a secondary risk to humans and other non-target mammals. In particular, the poisonous compounds contained in the rodenticide are typically hazardous to persons handling the rodenticide. Moreover, the rodenticide might be inadvertently swallowed by children or pets. Such exposure episodes can lead to serious illness.

One rodenticide active agent approved by regulatory authorities to be used for rat and mouse control is cholecalciferol (vitamin D3). This active leads to hypercalcemia, in other words an excess of calcium in the blood, which ultimately forms deposits in soft tissues such as the kidneys, heart, liver, causing their failure. Any product launched in the United States based on cholecalciferol as an active agent must be registered by the Environmental Protection Agency (EPA), due to the toxicity profile of cholecalciferol to humans and pets. Similar requirements exist in a number of other countries. It would be desirable to provide a rodenticide bait composition for domestic use that is free or essentially free of substances that are toxic to humans or other non-target mammals at the concentrations required to induce hypercalcemia in rodents.

Accordingly, it is one object of the present invention to provide a rodenticide bait composition, suitable for domestic use, which is at least as effective against rodents as existing domestic rodenticide compositions while exhibiting reduced toxicity to humans or other non-target mammals.

It is an alternative and/or additional object to provide a rodenticide bait composition, suitable for domestic use, which is at least as effective against rodents as existing rodenticide compositions while being free or essentially free of substances that are toxic to humans or other non-target mammals at the concentrations required to induce hypercalcemia in rodents.

It is an alternative and/or additional object to provide a rodenticide bait composition that may not require regulatory approval.

It is an alternative and/or additional object to provide a mixture that can be used as dehydrant in a rodenticide bait composition, which creates stress in the stomach of the rodent.

SUMMARY OF THE INVENTION

In a first aspect, the present invention relates to a rodenticide bait composition comprising a calcium salt and a dehydrant; wherein the calcium salt is selected from the group consisting of calcium carbonate, calcium citrate, calcium acetate, calcium benzoate, calcium octanoate, calcium stearate, calcium silicate, calcium oxide silicate, calcium sulfate, calcium chloride, calcium bromide, calcium iodide, calcium lactate, calcium gluconate, calcium oxalate, calcium phosphate and combinations of two or more thereof; wherein the calcium salt is present in an amount of less than 20 wt. % based on the total weight of the composition; and wherein the dehydrant comprises one or more sources of cellulose and one or more sources of phospholipids.

In one embodiment, the one or more sources of cellulose is selected from the group consisting of carboxymethyl cellulose, cardboard, cellulose acetate, regenerated cellulose, hydroxyethyl cellulose, hydroxypropyl cellulose, hydroxypropylmethyl cellulose, methylcellulose, pectin, sodium carboxymethyl cellulose, cornmeal, corn grits, corn cobs, corn gluten meal, and combinations thereof; preferably the one or more sources of cellulose is corn cobs or corn gluten meal, more preferably the one or more sources of cellulose is corn gluten meal.

In another embodiment, said one or more sources of phospholipids is selected from the group consisting of soybean oil, castor oil, linseed oil, cottonseed oil, and combinations thereof; preferably said one or more sources of phospholipids is soybean oil.

In one embodiment, said dehydrant comprises at least 50 wt. % of said one or more sources of cellulose, based on the total weight of the dehydrant, preferably, at last 70 wt. %, more preferably between 70 wt. % and 95 wt. %.

In one embodiment, said dehydrant comprises at least 1 wt. % of said one or more sources of phospholipids, based on the total weight of the dehydrant, preferably at least 5 wt. %, more preferably between 5 wt. % and 15 wt. %, even more preferably between 5 wt. % and 10 wt. %.

In another embodiment, said dehydrant further comprises carrageenans, preferably a kappa-carrageenan.

In another embodiment, said dehydrant comprises at least 5 wt. % of said carrageenans, based on the total weight of the dehydrant, preferably at least 10 wt. %, more preferably at least 20 wt. %, even more preferably between 20 wt. % and 40 wt. %, for example, between 20 wt. % and 30 wt. %, such as between 20 wt. % and 25 wt. %.

In an embodiment said dehydrant comprises carrageenans, one or more sources of cellulose and one or more sources of phospholipids, preferably wherein the proportion of carrageenans:one or more sources of cellulose is between 1:1 and 1:10, preferably between 1:2 and 1:5 more preferably between 1:2.50 and 1:3.50.

In an embodiment said rodenticide bait composition comprises between 40 wt. % and 80 wt. % of the dehydrant based on the total weight of the composition, preferably between 50 wt. % and 70 wt. %, more preferably between 60 wt. % and 70 wt. %, even more preferably between 61 wt. % and 69 wt. %.

In another embodiment, said rodenticide bait composition further comprises a source of endogenous gas selected from the group consisting of sodium percarbonate, magnesium percarbonate, zinc percarbonate, calcium peroxide, calcium percarbonate, magnesium peroxide, zinc peroxide, sodium perborate, potassium monopersulfate, tetraacetylethylenediamine, sodium bicarbonate or combinations thereof, preferably said source of endogenous gas is sodium bicarbonate; and preferably said source of endogenous gas is present in an amount of at least 5 wt. %, preferably at least 10 wt. %, for example between 10 wt. % and 20 wt. %, based on the total weight of the composition.

In an embodiment, said calcium salt is present in an amount of between 5 wt. % and 18 wt. %, based on the total weight of the composition, preferably between 10 wt. % and 15 wt. %.

In an embodiment, said rodenticide bait composition is in the form of a solid, preferably in the form of a pellet or a soft bait block.

In a second aspect, the invention relates to a package comprising the rodenticide bait composition according to the invention.

In a third aspect, the invention relates to a method for exterminating a rodent, the method comprising administering to the rodent the rodenticide bait composition according to the invention.

In a fourth aspect, the invention relates to a method for preparing a rodenticide bait composition, the method comprising blending a calcium salt and a dehydrant with one or more further ingredients to form a rodenticide bait composition comprising less than 20 wt. % of the calcium salt, based on the total weight of the composition; wherein the calcium salt is selected from the group consisting of calcium carbonate, calcium citrate, calcium acetate, calcium benzoate, calcium octanoate, calcium stearate, calcium silicate, calcium oxide silicate, calcium sulfate, calcium chloride, calcium bromide, calcium iodide, calcium lactate, calcium gluconate, calcium oxalate, calcium phosphate and combinations of two or more thereof; and wherein the dehydrant comprises one or more sources of cellulose and one or more sources of phospholipids and preferably further comprises carrageenans In a fifth aspect, the invention relates to a use of a mixture comprising one or more sources of cellulose, one or more sources of phospholipids and carrageenans as dehydrant in a rodenticide bait composition.

In an embodiment, said one or more sources of cellulose is corn gluten meal, and/or said one or more sources of phospholipids is soybean oil.

Definitions

The following definitions are used in the present application.

"Rodenticide" as used in the present application means a composition suitable for rodent control, specifically the reduction in rodent populations such as rats and mice.

"Bait" as used in the present application means a substance suitable for enticing the target rodents, and in particular a foodstuff.

"Dehydrant" as used in the present application means a substance or combination of substances capable of induce or produce dehydration of a rodent. For example, it can induce dehydration by preventing water absorption by the body of the rodent; or it can produce dehydration by absorbing or taking water from the body of the rodent.

"Corn gluten meal or CGM" as used in the present application means by-product of corn processing, and it is the principal protein of corn (maize) endosperm consisting mainly of zein and glutelin.

"Carrageenans" as used in the present application means family of linear sulfated polysaccharides that are extracted from red edible seaweeds. They are large, highly flexible molecules that form curling helical structures, which give them the ability to form gels. They are made up of repeating galactose units and 3,6 anhydrogalactose, both sulfated and nonsulfated. The units are joined by alternating α-1,3 and β-1,4 glycosidic linkages. Carrageenans can be present in three main commercial classes: kappa, iota and lambda. The kappa and iota forms have the ability to form gels.

"Bioavailability" as used in the present application means the proportion of the ingested calcium that enters the bloodstream of the rodent.

"Administering" as used in the present application means making the composition according to the invention available to the rodent such that it is subsequently ingested by the rodent, for example by placing the composition in one or more locations frequented by the rodent.

DETAILED DESCRIPTION OF THE INVENTION

In a first aspect, the present invention relates to a rodenticide bait composition comprising a calcium salt and a dehydrant; wherein the calcium salt is selected from the group consisting of calcium carbonate, calcium citrate, calcium acetate, calcium benzoate, calcium octanoate, calcium stearate, calcium silicate, calcium oxide silicate, calcium sulfate, calcium chloride, calcium bromide, calcium iodide, calcium lactate, calcium gluconate, calcium oxalate, calcium phosphate and combinations of two or more thereof; wherein the calcium salt is present in an amount of less than 20 wt. % based on the total weight of the composition; wherein the dehydrant comprises one or more sources of cellulose and one or more sources of phospholipids.

Like cholecalciferol, the calcium salts used in the present invention induce hypercalcemia in rodents. However, these salts are not toxic to humans or other non-target mammals at the dosages required to induce hypercalcemia in rodents. The compositions of the present invention are effective against rodents, despite the relatively low concentrations of calcium salt employed.

The present invention will now be described further. In the following passages different aspects/embodiments of the invention are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The rodenticide bait composition comprises a calcium salt selected from the group consisting of calcium carbonate ($CaCO_3$), calcium citrate ($Ca_3(C_6H_5O_7)_2$), calcium acetate ($C_4H_6O_4Ca$), calcium benzoate ($Ca(C_7H_5O_2)_2$), calcium octanoate ($C_{16}H_{30}CaO_4$), calcium stearate ($C_{36}H_{70}CaO_4$), calcium silicate ($CaSiO_3$), calcium oxide silicate ($Ca_3O(SiO_4)$), calcium sulfate ($CaSO_4$), calcium chloride ($CaCl_2$)), calcium bromide ($CaBr_2$), calcium iodide ($CaI_2$), calcium lactate ($C_6H_{10}CaO_6$), calcium gluconate ($C_{12}H_{22}CaO_{14}$), calcium oxalate ($CaC_2O_4$), calcium phosphate ($Ca_3(PO_4)_2$) and combinations of two or more thereof. This list encompasses the calcium salts themselves as well as hydrates and derivatives thereof.

Preferably, the calcium salt is selected from the group consisting of calcium carbonate, calcium citrate, calcium acetate, calcium benzoate, calcium octanoate, calcium stearate, calcium silicate, calcium oxide silicate, calcium sulfate and combinations of two or more thereof. These calcium salts are exempt from federal registration in the United State for use in rodenticide compositions. Preferably, the calcium salt is selected from the group consisting of calcium carbonate, calcium citrate, calcium acetate, and combinations of two or more thereof. Most preferably, the calcium salt is or comprises calcium carbonate or calcium citrate.

The calcium salt is present in an amount of less than 20 wt. % based on the total weight of the rodenticide bait composition.

In an embodiment the calcium salt is present in an amount of between 5 wt. % and 18 wt. %, based on the total weight of the rodenticide bait composition, preferably between 10 wt. % and 15 wt. %.

In another embodiment, the calcium in the calcium salt is present in an amount of from 0.5 to 12 wt. % based on the total weight of the rodenticide bait composition, more preferably from 1 to 10 wt. %. It is to be understood that these amounts exclude any calcium present in the composition from sources other than that calcium salt.

Preferably, the rodenticide bait composition comprises less than 0.5 wt. % of cholecalciferol based on the total weight of the composition, more preferably less than 0.1 wt. %. Most preferably, the rodenticide bait composition is free or substantially free of cholecalciferol.

The rodenticide bait compositions of the present invention are effective against rodents, even at relatively low calcium salt concentrations, i.e. at calcium salt concentration of less than 20 wt. %, based on the total weight of the rodenticide bait composition. In particular, the compositions, when eaten in a suitable amount (a typical daily feed) are effective in inducing sub-acute (also known as chronic-type) hypercalcemia in rodents. Sub-acute rodenticides are slow acting and typically take more than 12 hours, often up to 24 hours or longer, for the onset of symptoms of toxicosis to appear. This is necessary to allow sufficient time for a lethal dose of calcium to be absorbed into the blood of the rodent In one embodiment, the one or more sources of cellulose, which is present in the dehydrant, is selected from the group consisting of carboxymethyl cellulose, cardboard, cellulose acetate, regenerated cellulose, hydroxyethyl cellulose, hydroxypropyl cellulose, hydroxypropylmethyl cellulose, methylcellulose, pectin, sodium carboxymethyl cellulose, cornmeal, corn grits, corn cobs, corn gluten meal, and combinations thereof; preferably the one or more sources of cellulose is corn cobs or corn gluten meal, more preferably the one or more sources of cellulose is corn gluten meal.

In another embodiment, the said one or more sources of phospholipids, which is present in the dehydrant, is selected from the group consisting of soybean oil, castor oil, linseed oil, cottonseed oil, and combinations thereof; preferably said one or more sources of phospholipids is soybean oil.

Without being bound to any theory, the present inventors believe that a dehydrant comprising one or more sources of cellulose and one or more sources of phospholipids creates stress conditions in the stomach of a rodent due to dehydration, and this stress promotes the absorption of calcium from the calcium salt by the rodent; i.e. it increases calcium bioavailability. This leads to hypercalcemia and subsequent failure of body organs of the rodent. The one or more sources of cellulose would absorb water from the body of the rodent, whilst the one or more sources of phospholipids would prevent absorption of water; both then leading to dehydration. In addition, phospholipids bind to calcium, improving calcium bioavailability.

The dehydrant may comprise at least 50 wt. % of said one or more sources of cellulose, based on the total weight of the dehydrant, preferably, at last 70 wt. %, more preferably between 70 wt. % and 95 wt. %. Furthermore, the dehydrant may comprise at least 1 wt. % of said one or more sources of phospholipids, based on the total weight of the dehydrant, preferably at least 5 wt. %, more preferably between 5 wt. % and 15 wt. %, even more preferably between 5 wt. % and 10 wt. %.

Preferably, the dehydrant further comprises carrageenans, preferably a kappa-carrageenan. The amount of carrageenans in the dehydrant may be of at least 5 wt. %, based on the total weight of the dehydrant, preferably at least 10 wt. %, more preferably at least 20 wt. %, even more preferably between 20 wt. % and 40 wt. %, for example, between 20 wt. % and 30 wt. %, such as between 20 wt. % and 25 wt. %.

The present inventors have observed that by adding carrageenans to the dehydrant, calcium homeostasis mechanism in the body of a rodent, which helps regulating the calcium in the body, is affected. With other words, when carrageenans are added to the dehydrant the efficacy of the rodenticide bait composition is improved, as calcium bioavailability is increased.

Without being bound to any theory, the present inventors believe that a dehydrant comprising one or more sources of cellulose, one or more sources of phospholipids and carrageenans, creates stress conditions in the stomach of the rodent which are even more pronounced that when only one or more sources of cellulose and one or more sources of phospholipids are used. It is believed that the source of cellulose, e.g. corn gluten meal, and carrageenan absorb water and form a lump in the stomach of the rodent, which cannot be easily metabolized and hence no nutrition is available to the rodent. The body's mechanism of the rodent to selectively absorb nutrients becomes weaker and more calcium is then absorbed; i.e. calcium bioavailability is increased. Furthermore, carrageenans, specially kappa-carrageenan, form a hard lump in presence of calcium salts, which further helps in the reduction of the rodent's metabolism. In addition, carrageenans cause inflammation of the stomach and intestine in rodents, hence enhancing calcium absorption by the rodent.

For example, the dehydrant may comprise carrageenans, one or more sources of cellulose and one or more sources of phospholipids, wherein preferably the proportion of carrageenans:one or more sources of cellulose is between 1:1 and 1:10, preferably between 1:2 and 1:5 more preferably between 1:2.50 and 1:3.50.

The rodenticide bait composition may comprise between 40 wt. % and 80 wt. % of the dehydrant based on the total weight of the composition, preferably between 50 wt. % and 70 wt. %, more preferably between 60 wt. % and 70 wt. %, even more preferably between 61 wt. % and 69 wt. %.

In an embodiment, the rodenticide bait composition further comprises a source of endogenous gas selected from the group consisting of sodium percarbonate, magnesium percarbonate, zinc percarbonate, calcium peroxide, calcium percarbonate, magnesium peroxide, zinc peroxide, sodium perborate, potassium monopersulfate, tetraacetylethylenediamine, sodium bicarbonate or combinations thereof, preferably said source of endogenous gas is sodium bicarbonate; and preferably the source of endogenous gas is present in an amount of at least 5 wt. %, preferably at least 10 wt. %, for example between 10 wt. % and 20 wt. %, based on the total weight of the composition.

The present inventors have observed that by adding a source of endogenous gas to the rodenticide bait composition, e.g. sodium bicarbonate, carbon dioxide is generated in the stomach of the rodents, because of the stomach acid. This causes more stress conditions in the stomach of the rodent and, furthermore, the lump formed by the dehydrant becomes bigger.

The composition may have a pH of less than 10 at 1 wt. % aqueous solution or dispersion at 20° C., for example a pH of less than 9 or a pH lower than 7. It will be understood that the rodenticide bait composition may have a pH of between 7 and 10, preferably between 7 and 9, at 1 wt. % aqueous solution or dispersion at 20° C. or the composition may have a pH lower than 7, such as less than 6.8, or less than 6.5. In other words, the composition preferably has these pH values when diluted in water in an amount of 1 wt. % based on the weight of the aqueous solution or dispersion that forms.

It is believed that an acidic pH improves the solubility and bioavailability of the calcium, reducing the amount of calcium required to induce hypercalcemia in the target rodent and/or improving the efficacy of the composition. The composition may comprise an acid selected from the group consisting of citric acid, maleic acid, lactic acid, acetic acid and combinations of two or more thereof. More preferably, the acid is or comprises citric acid and/or maleic acid. The acid(s) are preferably present in an amount sufficient to lower the pH of the composition at 1 wt. % aqueous solution or dispersion at 20° C. to less than 7, more preferably less than 6.8, still more preferably less than 6.5.

Phospholipids have been found to bind to calcium, improving its bioavailability. Preferably, the one or more phospholipids are selected from the group consisting of phosphatidylcholine, phosphatidylethanolamine, phosphatidylinositol, phosphatidic acid, phosphatidylserine, lysophosphatidylcholine, lysophosphatidylinositol, lysophosphatidylserine, lysophosphatidic acid, phytoglycolipids and combinations of two or more thereof. Preferably, the one or more phospholipids are present in a total amount of from 0.5 to 10 wt. % based on the total weight of the rodenticide bait composition. Preferably, the one or more phospholipids and the calcium in the calcium salt are present in a weight ratio of from 0.1:1 to 10:1. Suitable sources of phospholipids for use in the present invention include vegetable oils such as soybean oil, rapeseed oil, sunflower oil and wheatgerm oil. Other suitable sources of phospholipids for use in the present invention include lecithin, egg yolks and bovine milk.

In an embodiment, the composition comprises casein. The casein may be in micellar form or in the form of a salt such as sodium caseinate. Casein has been found to form complexes with calcium and improve its bioavailability. Preferably, the casein is present in an amount of from 0.5 to 10 wt. % by weight of the composition. It is to be understood that these amounts refer to the casein itself to the exclusion of any associated counterions. Preferably, the casein and the calcium in the calcium salt are present in a weight ratio of from 0.2:1 to 10:1.

In another embodiment, the composition comprises lactose. It is believed that lactose hydrolyses in the small intestine of the rodent to form lactic acid, providing an acidic environment that improves the solubility and bioavailability of any calcium that was not absorbed into the bloodstream from the stomach. Preferably, the lactose is present in an amount of from 0.5 to 10 wt. % by weight of the composition. Preferably, the lactose and the calcium in the calcium salt are present in a weight ratio of from 0.2:1 to 10:1. Including lactose together with one or more of the aforementioned bioavailability-enhancing components (phospholipid, casein and/or an acid) helps to ensure good bioavailability of the calcium along the digestive tract of the rodent.

Attractants/Feeding Stimulants

Preferably, the composition comprises one or more feeding stimulants and/or one or more attractants. An attractant is a material that is used to help bring a rodent close to the bait. A feeding stimulant entices the rodent to feed and to keep feeding on the bait. A material may function as both an attractant and a feeding stimulant. Attractants can be a food item or a curiosity enhancer. The former motivates the rodent to approach the bait out of desire to eat it while the latter motivates a rodent to approach out of some other, non-food related desire (for example to investigate where an interesting odour is coming from). Pheromones (for example sexual attractants) are examples of curiosity enhancers. Attractants rely on odour solely to bring the rodent into close proximity to the bait thereby increasing the chance that the rodent will eat the bait.

Suitable stimulants, which are also attractants include: whole and processed seeds including cereal grains; sugar and sugar products; honey; meat and meat products including blood and fat; dairy products; eggs and egg products including shell and yolk; starch; and whole and processed nuts. The term "seeds" is intended to include seeds in general such as sunflower, thistle, poppy and pumpkin seeds as well as cereal grains such as oats, wheat, rice, barley, corn and millet. The term "processed seeds" is intended to include seeds that are crushed, cracked, rolled, or milled to various consistencies including flour.

The bait composition of the present invention may include a mixture of feeding stimulants. It may also include at least one attractant. Suitable attractants include pheromones, yeast, and black pepper.

Preferred attractants/stimulants are whole and processed seeds including cereal grains; sugar and sugar products; starch; nuts and processed nuts; and vegetable oil.

Other suitable feeding stimulants/attractants include malt extract and peanut butter oil.

Optional Excipients and Adjuvants

The composition optionally includes one or more rodenticidally compatible excipients and/or adjuvants such as dye, bittering agent, solvent, flow agent, binding agent, weatherability enhancer, preservative and fillers.

Dyes are often added to bait to clearly identify them as non-food items, to deter accidental consumption by people, to deter consumption by non-target animals and to disclose consumption of the bait in the faeces or vomitus. The most common colours used are deep greens and blues.

Bittering agents may be included to minimise the risk of accidental consumption by humans. A suitable agent is denatonium benzoate. This is an extremely bitter tasting compound that at the optimum concentration will be highly distasteful to people but not to rodents. When present, a human taste deterrent is suitably used in an amount of from 1 to 200 ppm, preferably from 1 to 100 ppm, more preferably from 5 to 50 ppm and most preferably from 5 to 20 ppm.

Flow agents and binding agents may be included depending on the format of the bait composition. Binding agents may be used to stick the poison to the outside of loose whole grains and seeds or to help provide some cohesion to the bait if prepared in the form of a paste. Flow agents (such as mineral clay, aluminium silicate) facilitate extrusion and are therefore often used in pellets and extruded blocks.

Preferably, the composition comprises one or more binding agents. Preferably, the one or more binding agents are present in a total amount of from 2 to 20 wt. % by weight of the composition, more preferably from 5 to 10 wt. %. Suitable binding agents include corn oil and corn cob-based binding agents.

The addition of paraffin wax to bait greatly improves its resistance to moisture and hence its weatherability.

Paraffin greatly improves the effectiveness of rodenticidal baits in tropical, humid climates; in damp indoor locations (kitchens, garages etc.); and in a number of different outdoor situations (e.g. sewer and burrow baiting). Suitable amounts of paraffin range from 5-50%.

Insecticides (e.g. 0.1 wt. % Malathion) and mould inhibitors (e.g. 0.1 wt. % 2,3,5 trichlorophenylacetate) may be added to grain-based bait to prevent attack by insect pests and to extend the shelf life of the product.

Preferably, the composition comprises one or more preservatives. Preferably, the one or more preservatives are present in a total amount of from 0.2 to 2 wt. % by weight of the composition, more preferably from 0.5 to 1.5 wt. %. Preferably, the preservative is or comprises sodium benzoate and/or potassium sorbate.

Preferably, the composition further comprises a filler. The filler may include, for example, wheat flour and/or soybean hulls. Soybean hulls have been found to improve the processability of the composition during its manufacture.

Product Format

There are a wide variety of conventional bait formats suitable for the present invention. The choice of format will depend on the environment in which it is to be used.

Meal

Meal baits consist of a mixture of whole, ground and/or rolled grains in a range of sizes from fine powdery particles (flour, corn meal) to whole rolled oats, or whole or broken grains.

Rodents commonly carry food back to their nest or borrow where they may eat it, store it and eat it at a later time, or store it and never eat it. For poisoned bait, the latter is clearly wastage. Meal minimises hoarding simply because it is difficult for a rodent to carry away. The main disadvantages of meal are that it can be messy to use (flour is hard to clean up and can be inhaled), it can be easily contaminated with dirt reducing its desirability to rodents, and its quality quickly deteriorates once removed from its packaging.

Seeds/Cereal Grains

Seed mixes such as canary seed, and whole, cracked or rolled cereal grains such as wheat, rice, maize, oat, barley and millet form the basis of most commercial baits.

For whole grain baits, husks or hulls are removed. The poison is stuck to the outside of the seed or grain using a "sticker" substance while the inside of the grain or seed may remain free of poison.

Seeds in general and cereal grains in particular are a highly desirable food for commensal rodents. The type of seed or grain preferred depends on the type of rodent and on the type of seed or grain with which they are familiar (rice, wheat, millet etc). The size of the grain or seed should be within preferred range for the target rodent.

For example, Norway rats prefer grains in the 0.4 to 0.7 mm diameter size range. Rats generally prefer bigger grains and seeds than mice.

The main disadvantage of whole seed or grain bait is that it is easy for a rodent to hoard and it can be very attractive to nontarget animals such as granivorous (seed or grain eating) birds. Also, this format could have palatability problems if the poison is intrinsically unpalatable. The poison is stuck to the outside of the grain or seed so is at a relatively high concentration.

When a rodent bites into the bait it is much more likely to taste a poison than would be the case for more homogenous bait formats such as pellets and blocks. A similar difficulty may apply to meal baits.

Pellets

Pellets are produced by extruding a steamed, soft, hot dough mix of milled grain, poison and other additives through a die after which they are then cut to size.

Pellets are hardened by compression during the process of extrusion and, after extrusion, as they set and moisture content is lowered during oven drying. The degree of hardening is a function of temperature, compression pressure used and drying time. The result is hard, brittle pellets of a consistent diameter and length. Size may vary depending on the target rodent (rat or mouse). Pellets are usually about 3-5 mm diameter and 5-10 mm long cylinders.

The addition of an amount of paraffin wax improves the moisture-resistance capabilities (i.e. weatherability) of the pellets. However, while this extends their range of applications to, for example, more humid areas of the house and gives the pellets better performance in humid climates, it also probably lowers the palatability of the bait. Pelletised bait is the most widespread and common rodenticide format and appears to be good general-purpose bait.

Moulded Wax Blocks

Moulded blocks are made by pouring a hot blend of grain, melted wax (typically 25-40%), poison and other additives into a mould to produce, upon cooling, a smooth, shiny, solid but waxy product. Blocks of 3-5 g and 15-35 g are typically produced. Of the bait formats this is the most moisture resistant but also the least palatable to rodents (the general rule is that the higher the wax content the less palatable the bait). Furthermore, the high temperature used during manufacture cooks and reduces the freshness and palatability of grains in the bait. Exposure to high temperatures (e.g. hot climates, or when put in roof voids) can cause the wax to soften. This makes the bait unpalatable to rats and mice and so ineffective. The smoothness and shiny appearance of these blocks can make them less attractive to rodents.

Blocks may be made with a hole through the centre. This allows the blocks to be nailed to a substrate or secured in bait stations to prevent rodents carrying the bait away. Holes allow the blocks to be suspended off the ground (e.g. nailed to roof rafters in black rat control, or to minimise exposure to water) or threaded onto metal wire for insertion into burrows or down drains (Norway rat control).

Extruded Blocks or Cake

The palatability problem with moulded blocks is ameliorated with extruded blocks in two ways: less wax is used and the manufacturing temperature is lower. Though less wax is used, extruded blocks still have excellent moisture resistance characteristics. They are produced using a process similar to that used to manufacture bait pellets-extrusion and compression of dough through a die with subsequent cutting to size. Compared to moulded blocks, extruded blocks are harder, have a duller, relatively rougher surface; all three features increasing the attractiveness of these blocks to rodents. Some are designed to be broken into smaller pieces by the user whereas others are cut to a size as they exit the die.

The manufacturing process allows these products to be made into complex shapes with multiple sharp edges to encourage rodents to gnaw the bait. The idea is that rodents like to chew on corners because this gives purchase for their teeth. Dies are therefore used that aim to maximise the number of corners while optimising their arrangement on the block. The effectiveness of blocks with many corners versus those with few is unknown.

As for moulded blocks, extruded blocks may be made with hole for attachment. The lower wax content also makes them less prone to softening at high temperatures.

Compressed Blocks

Like extruded blocks, the compressed block format also aims to optimise the balance between palatability and weatherability. They are not made by extrusion through a die but by compression of a warm dough mix in a mould that shapes and compresses it to ensure a hard block upon cooling and drying. Compressed blocks have a dull finish but are smoother than extruded blocks. They also have a dusty surface (perhaps to facilitate their release from the mould).

Paste

This is a soft mix of meal bait based on fats or oils. This format thus has a high moisture content differentiating it from all other formats. It can be a very useful format to use in locations where spillage of bait can be a problem (e.g. food storage areas, kitchens etc.) or where rodents have limited access to water.

Pastes and gels may be applied with caulking guns.

Preferably, the composition is in the form of a solid at 20° C. and $10^5$ Pa pressure. The composition is preferably in the form of a plurality of pellets or a soft bait block.

In an especially preferred embodiment, there is provided a rodenticide bait composition comprising:
  (i) from 2 to 5 wt. % of a calcium salt selected from the group consisting of calcium carbonate, calcium citrate, calcium acetate, and combinations of two or more thereof;
  (ii) from 5 to 7 wt. % of a phospholipid-containing vegetable oil; and
  (iii) citric acid and/or maleic acid;
    wherein the composition has a pH of less than 7 at 1 wt. % aqueous solution or dispersion at 20° C.

In another especially preferred embodiment, there is provided a rodenticide bait composition comprising:
  (i) from 5 wt. % to 18 wt. % of a calcium salt, based on the total weight of the composition, selected from the group consisting of calcium carbonate, calcium citrate, calcium acetate, and combinations of two or more thereof;
  (ii) from 40 wt. % to 80 wt. % of a dehydrant, based on the total weight of the composition, comprising one or more sources of cellulose, one or more sources of phospholipids and carrageenan, preferably kappa-carrageenan;
    wherein the one or more sources of cellulose is corn cobs or corn gluten meal;
    wherein the one or more sources of phospholipids is soybean oil; and
    wherein the dehydrant comprises at least 5 wt. % of carrageenans, based on the total weight of the dehydrant.

In another especially preferred embodiment, there is provided a rodenticide bait composition comprising:
  (i) from 10 wt. % to 18 wt. % of a calcium salt, based on the total weight of the composition, selected from the group consisting of calcium carbonate, calcium citrate, calcium acetate, and combinations of two or more thereof;
  (ii) from 61 wt. % to 69 wt. % of a dehydrant, based on the total weight of the composition, comprising one or more sources of cellulose, one or more sources of phospholipids and carrageenan, preferably kappa-carrageenan;
    wherein the one or more sources of cellulose is corn cobs or corn gluten meal;
    wherein the one or more sources of phospholipids is soybean oil; and
    wherein the dehydrant comprises between 20 wt. % and 25 wt. % of carrageenans, based on the total weight of the dehydrant.

According to a second aspect, the invention provides a package comprising the rodenticide bait composition as described herein.

According to a third aspect, the invention provides a method for exterminating a rodent, the method comprising administering to the rodent a composition as described herein.

Preferably, the rodent is a rat or a mouse.

Preferably, the composition is administered to the rodent in a total amount of from 5 to 20% of the bodyweight of the rodent per 24-hour period, more preferably from 10 to 20%. If the rodent is a mouse, the composition is preferably administered to the mouse in a total amount of from 2 to 10 grams per 24-hour period, more preferably from 4 to 8 grams, still more preferably from 5 to 6 grams. If the rodent is a rat, the composition is preferably administered to the rat in a total amount of from 15 to 60 grams per 24-hour period, more preferably from 20 to 40 grams, still more preferably from 20 to 25 grams.

Preferably, the composition is administered to the rodent in an amount sufficient to induce sub-acute hypercalcemia within a period of less than 24 hours of first ingesting the composition. Preferably, the composition is administered to the rodent in an amount sufficient to provide a calcium concentration in the blood of at least 18 mg per 100 mL within a period of less than 24 hours of first ingesting the composition. Such a concentration is sufficient to induce sub-acute hypercalcemia in rodents.

According to a fourth aspect, the invention provides a method for preparing a rodenticide bait composition, the method comprising blending a calcium salt and a dehydrant with one or more further ingredients to form a rodenticide bait composition comprising less than 20 wt. % of the calcium salt, based on the total weight of the composition, wherein the calcium salt is selected from the group consisting of calcium carbonate, calcium citrate, calcium acetate, calcium benzoate, calcium octanoate, calcium stearate, calcium silicate, calcium oxide silicate, calcium sulfate, calcium chloride, calcium bromide, calcium iodide, calcium lactate, calcium gluconate, calcium oxalate, calcium phosphate and combinations of two or more thereof; and wherein the dehydrant comprises one or more sources of cellulose and one or more sources of phospholipids and preferably carrageenans.

Preferably, the rodenticide bait composition is the composition in accordance with the first aspect.

Preferably, the method further comprises packaging the composition.

According to a fifth aspect, the invention provides a use of a mixture comprising one or more sources of cellulose, one or more sources of phospholipids and carrageenans as dehydrant in a rodenticide bait composition. This mixture creates stress in the stomach of the rodent, which increases bioavailability of, for example, calcium.

Preferably, said one or more sources of cellulose is corn gluten meal, and/or said one or more sources of phospholipids is soybean oil.

According to a further aspect, the present invention provides the use of a composition as described herein in exterminating a rodent.

The invention will be further described, by way of example, with the reference to the following non-limiting examples.

EXAMPLES

Example 1

Three compositions comprising a calcium salt and a dehydrant were prepared according to the formulation shown in Table 1. The dehydrant consists only of one or more sources of cellulose (corn cob) and one or more sources of phospholipids (vegetable oil).

TABLE 1

Rodenticide bait formulations

| Ingredient | % w/w |
| --- | --- |
| Calcium salt | 2-5% |
| Vegetable oil | 5-7% |
| Citric/maleic acid | pH below 6.5 |
| Wheat flour | QS |
| Corn cob | 5-10% |
| Sodium benzoate | 1% |
| Malt extract (optional) | 1% |

(QS = amount sufficient for total to add up to 100% w/w)

Each composition was prepared in the form of pellets by blending the ingredients together and pressing the resulting mixture in a pellet mill.

The three specific compositions were as is shown in Table 2. The parameter that was varied was the calcium salt and the type or acid that was used.

TABLE 2 specific compositions with different calcium salts

| Ingredient | A | B | C |
| --- | --- | --- | --- |
| Calcium carbonate | 3% | X | X |
| Calcium citrate | X | 3% | |
| Calcium acetate | X | X | 3% |
| Soybean oil | 6% | 6% | 6% |
| Citric acid | pH < 6.5 | X | X |
| Maleic acid | X | pH < 6.5 | X |
| 50% citric acid/ 50% maleic acid | X | X | pH < 6.5 |
| Wheat flour | QS | QS | QS |
| Corn cob | 5% | 8% | 10% |
| Sodium benzoate | 1% | 1% | 1% |
| Malt extract | X | 1% | X |

Example 2

One rodenticide bait composition comprising a calcium salt and a dehydrant was according to the formulation shown in Table 3. The dehydrant consists of one or more sources of cellulose (corn gluten meal), one or more sources of phospholipids (soybean oil) and kappa-carrageenan. In addition, the formulation of table 3 comprises a source of endogenous gas (sodium bicarbonate).

TABLE 3

Rodenticide bait formulation

| Ingredient | % w/w |
| --- | --- |
| Calcium citrate | 15.0 |
| Corn glute meal | 47.0 |
| Wheat flour | QS |
| Sodium bicarbonate | 13.6 |
| Soybean oil | 5.0 |
| Kappa-carrageenan | 16.0 |

(QS = amount sufficient for total to add up to 100% w/w)

The composition was prepared in the form of pellets by blending the ingredients together and pressing the resulting mixture in a pellet mill.

Although the formulations shown in Example 1 and Example 2 can be used as rodenticide, the formulation of Example 2 shows increased effectivity compared to the formulations of Example 1, as calcium bioavailability is dramatically increased. This demonstrates the synergistic effect of carrageenans and the one or more sources of cellulose in increasing bioavailability of calcium, due to the stress conditions created in the stomach of the rodent. This stress is further increased by the source of endogenous gas, leading to an increased calcium bioavailability.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

Hence one or more objects of the present invention are achieved by the present which is further elucidated in the appended claims.

The invention claimed is:

1. A rodenticide bait composition comprising:
   between 5 wt. % and 18 wt. % of a calcium salt, based on the total weight of the composition, wherein the calcium salt is selected from the group consisting of calcium carbonate, calcium citrate, calcium acetate, and combinations of two or more thereof; and
   between 40 wt. % and 80 wt. % of a dehydrant, based on the total weight of the composition, wherein the dehydrant comprises:
   between 70 wt. % and 95 wt. % of one or more sources of cellulose, based on the total weight of the dehydrant,
   between 1 wt. % and 15 wt. % of one or more sources of phospholipids, based on the total weight of the dehydrant, wherein the one or more sources of phospholipids is a vegetable oil, and
   at least one carrageenan; and
   wherein the rodenticide bait composition is free of cholecalciferol.

2. The rodenticide bait composition according to claim 1, wherein said one or more sources of cellulose is selected from the group consisting of carboxymethyl cellulose, cardboard, cellulose acetate, regenerated cellulose, hydroxyethyl cellulose, hydroxypropyl cellulose, hydroxypropylmethyl cellulose, methylcellulose, pectin, sodium carboxymethyl cellulose, cornmeal, corn grits, corn cobs, corn gluten meal, and combinations thereof.

3. The rodenticide bait composition according to claim 1, wherein the vegetable oil, is selected from the group consisting of soybean oil, castor oil, linseed oil, cottonseed oil, and combinations thereof.

4. The rodenticide bait composition according to claim 1, wherein said dehydrant comprises between 5 wt. % and 40 wt. % of said carrageenans, based on the total weight of the dehydrant.

5. The rodenticide bait composition according to claim 1, wherein the proportion of carrageenans:one or more sources of cellulose is between 1:1 and 1:10.

6. The rodenticide bait composition according to claim 1, wherein said rodenticide bait composition further comprises a source of endogenous gas selected from the group consisting of sodium percarbonate, magnesium percarbonate, zinc percarbonate, calcium peroxide, calcium percarbonate, magnesium peroxide, zinc peroxide, sodium perborate, potassium monopersulfate, tetraacetylethylenediamine, sodium bicarbonate or combinations thereof; and
wherein the source of endogenous gas is present in an amount of between 5 wt. % and 20 wt. %, based on the total weight of the composition.

7. The rodenticide bait composition according to claim 1, wherein the composition is in the form of a solid.

8. A package comprising the rodenticide bait composition according to claim 1.

9. A method for exterminating a rodent, the method comprising administering to the rodent the rodenticide bait composition according to claim 1.

10. A method for preparing a rodenticide bait composition, the method comprising:
blending at least one calcium salt and a dehydrant with at least one carrageenan and one or more further ingredients to form a rodenticide bait composition comprising between 5 wt. % and 18 wt. % of the calcium salt, based on the total weight of the composition and between 40 wt. % and 80 wt. % of the dehydrant, based on the total weight of the composition,
wherein the at least one calcium salt is selected from the group consisting of calcium carbonate, calcium citrate, calcium acetate, and combinations of two or more thereof; and
wherein the dehydrant comprises:
between 70 wt. % and 95 wt. % of one or more sources of cellulose, based on the total weight of the dehydrant, and
between 1 wt. % and 15 wt. % of one or more sources of phospholipids, based on the total weight of the dehydrant, and wherein the one or more sources of phospholipids is a vegetable oil; and
wherein the rodenticide bait composition is free of cholecalciferol.

11. The rodenticide bait composition according to claim 1, wherein said one or more sources of cellulose is corn cobs or corn gluten meal.

12. The rodenticide bait composition according to claim 1, wherein said one or more sources of phospholipids is soybean oil.

13. The rodenticide bait composition according to claim 1, wherein said dehydrant comprises between 5 wt. % and 10 wt. % of said one or more sources of phospholipids, based on the total weight of the dehydrant.

14. The method of claim 10, wherein said one or more sources of cellulose is corn gluten meal, and/or said one or more sources of phospholipids is soybean oil.

15. A rodenticide bait composition comprising:
at least one calcium salt present at a concentration between 5 wt. % and 18 wt. %, wherein the calcium salt is selected from the group consisting of calcium carbonate, calcium citrate, calcium acetate, and combinations of two or more thereof;
at least one source of cellulose present at a concentration between 28 wt. % to 76 wt. %;
at least one vegetable oil present at a concentration between 0.4 wt. % and 12 wt. %;
at least one carrageenan present at a concentration between 2 wt. % to 32 wt. %, and wherein a proportion of carrageenan:one or more sources of cellulose is between 1:1 about 1:10;
at least one source of endogenous gas present at a concentration between 5 wt. % and 20 wt. %;
at least one filler; and
wherein the rodenticide bait composition is free of cholecalciferol.

16. The rodenticide bait composition of claim 15, wherein:
the one or more sources of cellulose is selected from the group consisting of carboxymethyl cellulose, cardboard, cellulose acetate, regenerated cellulose, hydroxyethyl cellulose, hydroxypropyl cellulose, hydroxypropylmethyl cellulose, methylcellulose, pectin, sodium carboxymethyl cellulose, cornmeal, corn grits, corn cobs, corn gluten meal, and combinations thereof;
the vegetable oil is selected from the group consisting of soybean oil, castor oil, linseed oil, cottonseed oil, and combinations thereof;
the source of endogenous gas is selected from the group consisting of sodium percarbonate, magnesium percarbonate, zinc percarbonate, calcium peroxide, calcium percarbonate, magnesium peroxide, zinc peroxide, sodium perborate, potassium monopersulfate, tetraacetylethylenediamine, sodium bicarbonate or combinations thereof;
wherein the filler is selected from the group consisting of wheat flour, soybean hulls, and combinations thereof; and
wherein the composition is in the form of a solid.

17. A package comprising the rodenticide bait composition according to claim 15.

18. A method for exterminating a rodent, the method comprising administering to the rodent the rodenticide bait composition according to claim 15.

* * * * *